Oct. 12, 1926. 1,602,769
J. HOLLAND-LETZ
GRINDING MACHINE
Filed May 17, 1924 5 Sheets-Sheet 1
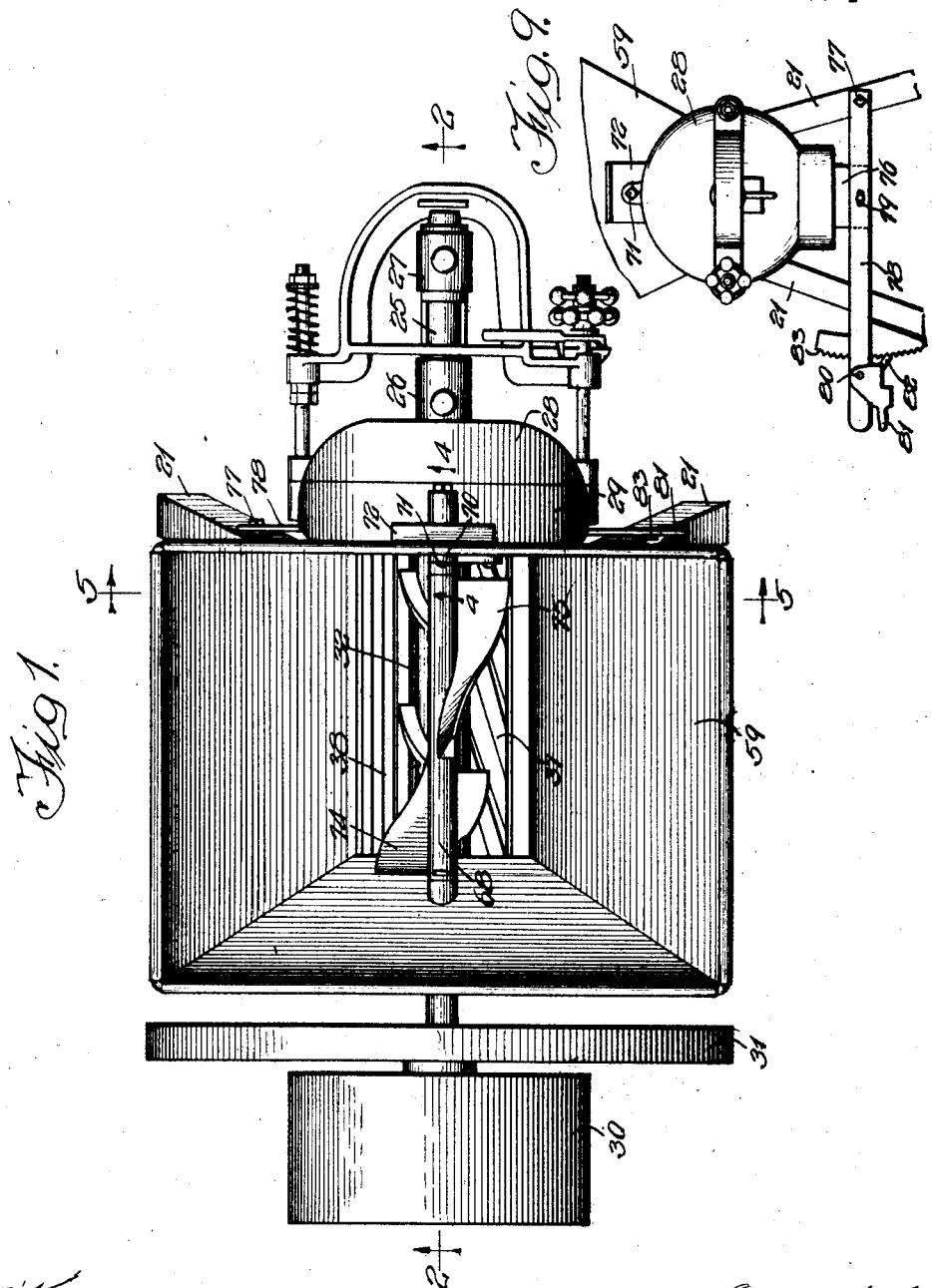

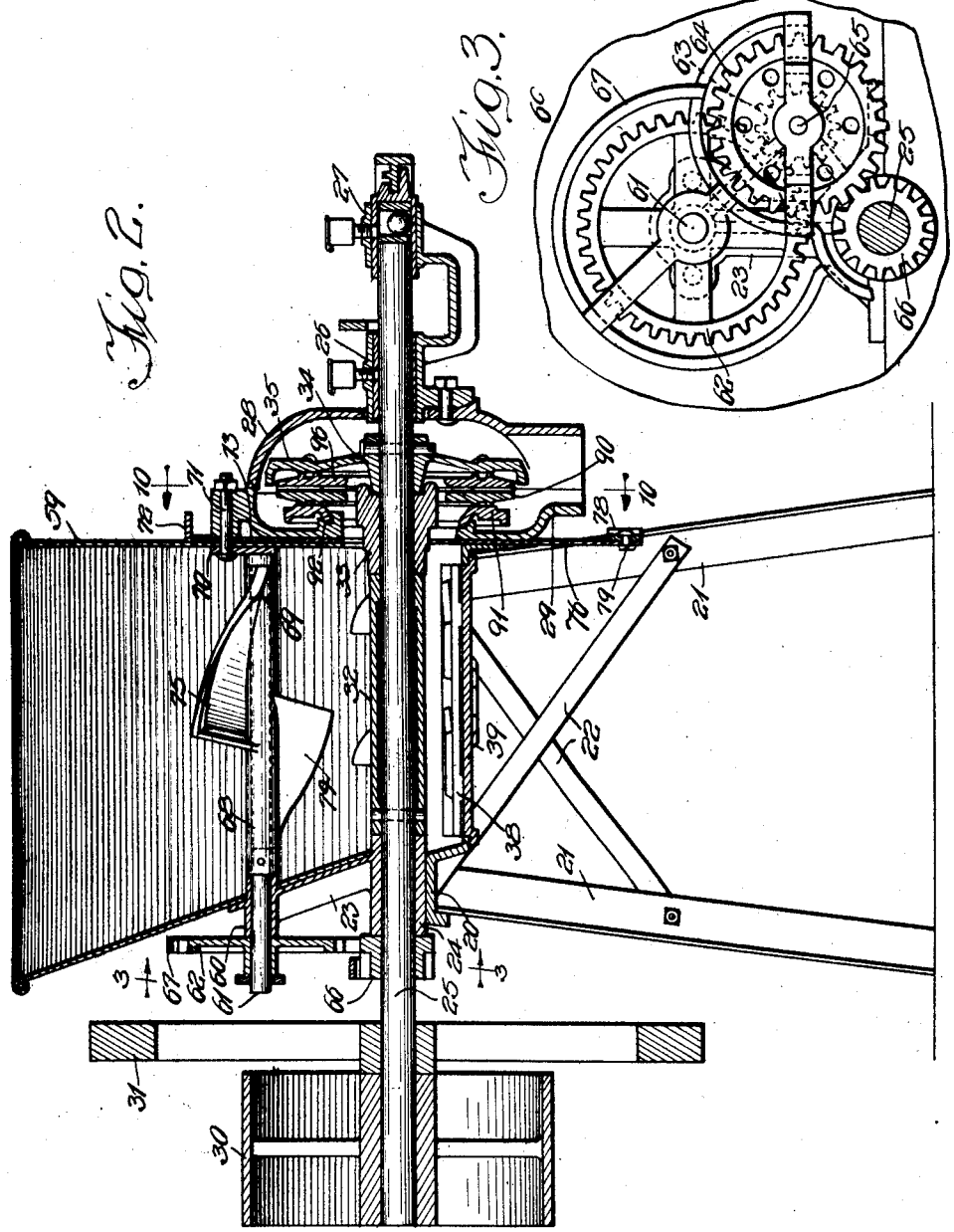

Oct. 12, 1926.
J. HOLLAND-LETZ
1,602,769
GRINDING MACHINE
Filed May 17, 1924　　5 Sheets-Sheet 3
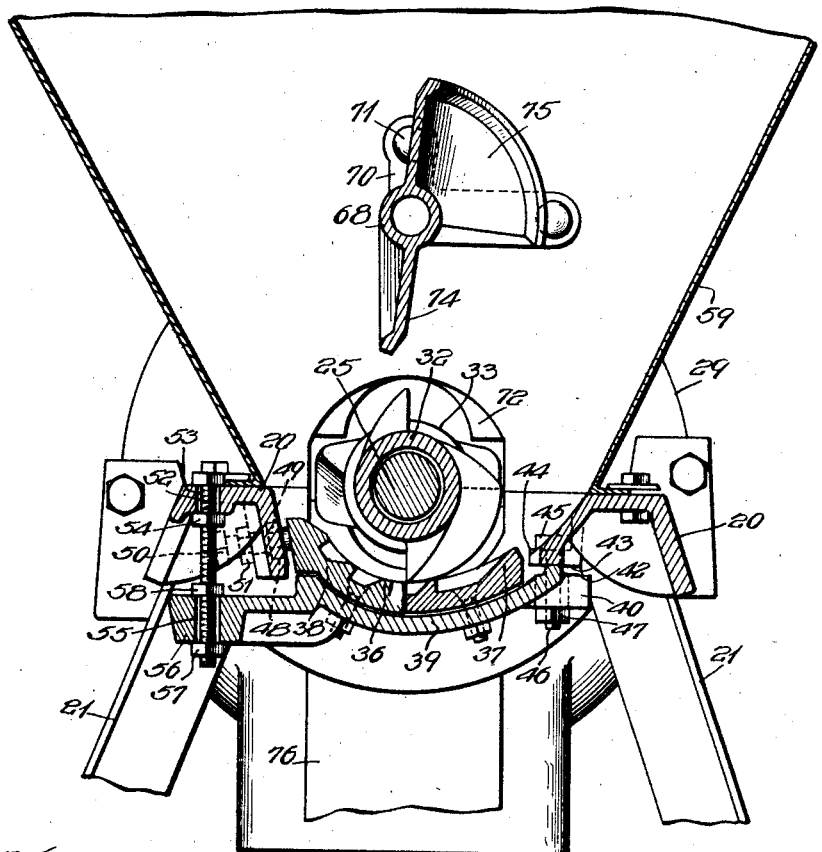
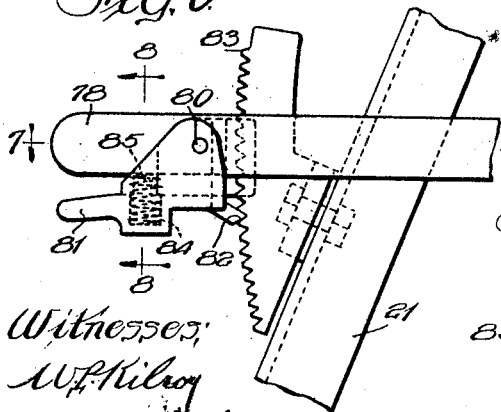
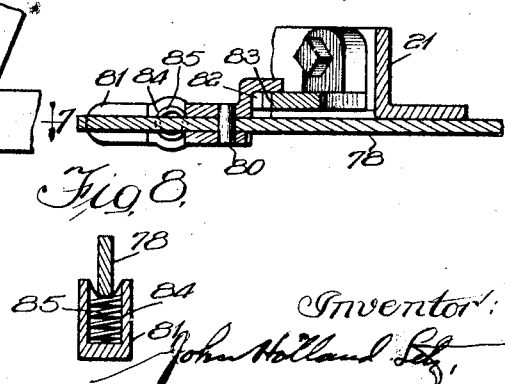
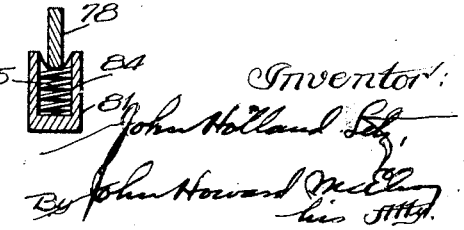

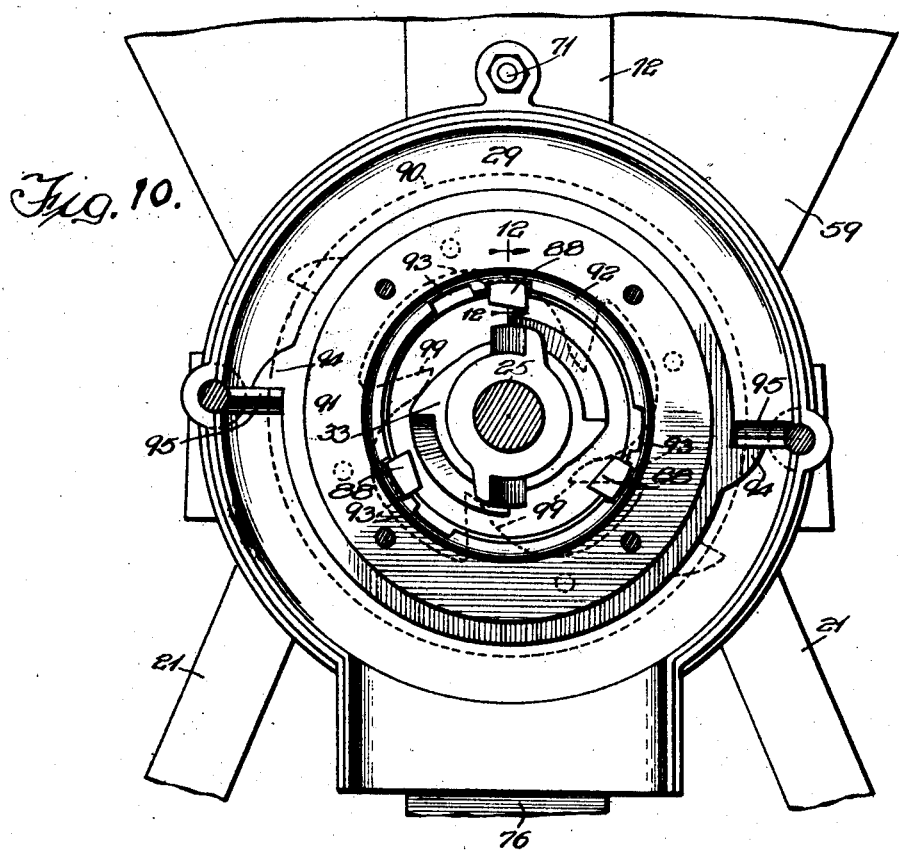

Oct. 12, 1926.  
J. HOLLAND-LETZ  
GRINDING MACHINE  
Filed May 17, 1924  
1,602,769  
5 Sheets-Sheet 5

Witnesses:  
W. F. Kilroy  
Harry R. L. White

Inventor  
John Holland-Letz  
By John Howard McElroy  
his Atty.

REISSUED AS NO. 16713
AUG 23 1927

Patented Oct. 12, 1926.

1,602,769

UNITED STATES PATENT OFFICE.

JOHN HOLLAND-LETZ, OF CROWN POINT, INDIANA, ASSIGNOR TO THE LETZ MANUFACTURING COMPANY, OF CROWN POINT, INDIANA, A CORPORATION OF INDIANA.

GRINDING MACHINE.

Application filed May 17, 1924. Serial No. 713,897.

My invention is concerned with grinding machines, and is designed to produce a simple structure of the class described that shall be especially efficient and which can be employed to grind jerked corn, i. e., ears of corn which have been snapped off of the stalks without removing the husks.

To these ends, it embodies various combinations and features of construction that will be fully described in the specification and particularly enumerated in the claims.

To illustrate my invention, I annex hereto five sheets of drawings, in which the some reference characters are used to designate identical parts in all the figures, of which,—

Fig. 1 is a top plan view of a machine embodying my invention;

Fig. 2 is a central, vertical section on the line 2—2 of Fig. 1;

Fig. 3 is a detail in section on the line 3—3 of Fig. 2;

Fig. 4 is a detail in section on the line 4—4 of Fig. 1;

Fig. 5 is a vertical section on the line 5—5 of Fig. 1, but on a larger scale;

Fig. 6 is a detail showing a portion of the feed adjusting mechanism, on an enlarged scale;

Figs. 7 and 8 are details in section on the lines 7—7 and 8—8, respectively, of Fig. 6;

Fig. 9 (Sheet 1) is a partial end elevation on an enlarged scale, showing the adjusting mechanisms of Figs. 6 to 8 assembled;

Fig. 10 is an enlarged detail in section on the line 10—10 of Fig. 2;

Fig. 11 is an enlarged detail of the portion of the mechanism seen in Fig. 10, but in a different adjustment;

Fig. 12 is a detail in section on the line 12—12 of Fig. 10;

Fig. 13 is a similar view in section on the line 13—13 of Fig. 11;

Fig. 14 is a top plan view of the concave, with the grinding shaft and portions above the same removed; and Figs. 15 and 16 are enlarged details in section on the lines 15—15 and 16—16, respectively, of Fig. 14.

In carrying out my invention, I preferably employ the base casting 20 seen in plan view in Fig. 14, which is supported by the four legs 21 at the corners thereof in the customary manner and preferably braced by the strips 22, as seen in Fig. 2. Bolted to the base casting 20 at one end is the bearing casting 23, which has the bearing sleeve 24 for the main shaft 25, the other end of which is journaled in bearings 26 and 27, which may be of any desired construction, and are supported from the outer buhr-casing casting 28, which is bolted to the inner buhr-casing casting 29, which in turn is bolted to the base casting 20, all in the manner well known in the art. The shaft 25 is rotated by power applied to the belt wheel 30, and is preferably provided with the fly wheel 31.

The shaft 25 has pinned on one end thereof a toothed sleeve 32, which has the interior thereof cored out, with the ends bored out to fit snugly on the shaft 25, and the end that is not pinned is provided with interlocking teeth (not shown) which engage with similar interlocking teeth (not shown) formed on the adjacent end of the auger 33, which may be of any desired construction, and is held in place by its engagement with the hub 34 of the rotating buhr plate 35, which is pinned by its hub to the shaft 25, as clearly shown in Fig. 2. The teeth on the sleeve 32 may be of any desired construction, but are preferably formed of a plurality of partial helixes with shearing edges and shaped so as to carry the material toward the buhr casing to deliver it to the grinding buhrs.

The teeth on the sleeve 32 co-operate with the teeth 36 of the concave, and which is best illustrated in Figs. 5 and 14, where it will be seen that the teeth are formed on two chilled steel castings 37 and 38, which are secured on the concave supporting casting 39 by the bolts 46 having their heads countersunk in the chilled castings 37 and 38. As the teeth on the sleeve 32 shear with the teeth 36, it is necessary to give them a proper initial adjustment, as well as to take up wear, and for this purpose I provide the adjustments best seen in Figs. 5 and 14 to 16. On one edge, the casting 39 is provided with the pair of lugs 40, each of which has the elongated, vertically extending slot 41, and upon either side of the center of the slot and above it are formed the bearing lugs 42, which co-operate with the bearing surfaces 43 formed on the under side of the base casting 20. Above the surface 43, the base casting 20 is provided with the rectangular recess 44, which is adapted to have the squared head 45 of the bolt 46 seated therein so as to prevent the bolt turning when the nut 47 is screwed thereon to secure the casting 39 in the desired adjustment. On the other side, and preferably directly opposite to the bearing just described, I form in the inner face of that portion of the base casting 20 a square recess 48, in which is placed the nut 49, through which is threaded a set screw 50 passing through an aperture in the base casting 20 and provided with a lock nut 51, so that by proper adjustment of the screws 50, the position of the chilled plates 37 and 38 will be maintained against the thrust resulting from the clockwise rotation of the shaft 25, as seen in Fig. 5. The casting 39 is supported in its vertical position by the bolt 52 having the elongated threaded portion passing through the elongated vertical slot 53 provided in the base casting 20 and locked in position on the casting by a lock nut 54. The lower end of the bolt passes through the elongated vertical slot 55 formed in the braced extension 56 of the casting 39, the position of the casting 39, and consequently of the teeth of the concave, being controlled by the nut 57 and the lock nut 58 in a manner which will be readily apparent.

The base casting 20 has bolted thereon in any desired manner the hopper 59, which is preferably of sheet-metal construction, and has extending through one end thereof a bearing sleeve 60 forming a part of the casting 23, and journaled in this sleeve 60 is the short shaft 61, which has secured thereon the gear wheel 62, which is driven by the spur gear pinion 63 (see Fig. 3) formed integral with the spur gear wheel 64 journaled on the stud shaft 65, and which in turn meshes with the spur gear pinion 66 secured on the shaft 25. A suitable framework 67 is provided to furnish supports for the shafts 61 and 65 and to shield the gears 62, 64 and 66. The inner end of the shaft 61 has pinned thereon the sleeve 68, which has its other end, best seen in Fig. 4, mounted to rotate on the bearing stud 69 projecting from the casting 70, which is bolted to the upper portion of the buhr-casing casting 29 by the bolt 71, said bolt thus serving to secure the adjacent side of the hopper 59 between the casting 70 and the casting 29, and also to guide the upper feed-controlling plate 72, which has the customary semicircular recess in its lower end, as seen in Fig. 5, together with the vertical slot 73, seen in Fig. 2, through which slot the bolt 71 passes, as will be readily apparent.

The sleeve 68 is rotated by the shaft 25 at a reduced speed, say one to 5, and it carries the pair of agitator teeth 74 and 75, which are preferably cast integral therewith, and are of the general shape of portions of a screw-conveyor helix covering say ninety degrees, but the two teeth have their curvature in the opposite direction, so that each tends to force any material passing it toward the center of the hopper 59, the purpose of this construction being to insure that any ears of corn passing said agitator will be directed to the central portion of the sleeve 32 so that none of the corn will be fed into the buhr casing without being more or less shredded by the co-operation of the teeth on the sleeve 32 with the teeth 36.

The radial dimensions of the agitator teeth 74 and 75 are much greater than those of the teeth on the sleeve 32, which their tips approach, so that the tips of all the teeth have about the same peripheral velocity.

The upper feed-controlling plate 72 is adjusted by the mechanism above described, but for the lower feed-plate 76, I preferably employ the adjusting means best shown in Figs. 6, 7, 8 and 9, where it will be seen I fulcrum to one of the legs 21 at 77 a lever 78 which is connected by the pin and slightly elongated slot connection 79 with the center of the lower portion of the feed-regulating plate 76. The other end of the lever 78 has pivoted thereto at 80 the spring catch lever 81, which has the nose 82 adapted to cooperate with the toothed segment 83 secured to the opposite leg 21. Located in the recess 84 in the lever is the helically-coiled expanding spring 85, which holds the dog 82 in any position of adjustment on the segment 83. With the mechanism shown, it will be observed that the plate 76 can quickly be adjusted to a nicety, and will remain in its adjustment until a change is desired.

Referring now to Figs. 10 to 13, the buhr-casing casting 29 is provided on its inner periphery with an annular flange 86, which has one face 87 thereof beveled, as seen in Figs. 12 and 13, and it is also provided with a plurality of projections 88 extending out beyond the flange 86 and toward the center. These lugs 88 are provided with the beveled surface 89 parallel to the surface 87, and the inner faces of these lugs 88 are preferably formed diagonally so as to constitute teeth co-operating with the adjacent peripheral portion of the auger 33, thus aiding in the cutting up of the material before it finally passes to the grinding buhrs. The trammeling buhr 90 is preferably a separate annular plate bolted to the buhr-supporting ring 91, which ring is provided on its inner periphery with the flange 92, having its surfaces parallel with the surfaces 87 and 89 of the flange 86 and the lugs 88. At a number of places corresponding in their location to the location of the lugs 88 are recesses 93 cut in the flange 92. The outer periphery of the plate 91 is provided with the diametrically oppositely located lugs 94, which co-operate with lugs 95 projecting inwardly from the surface of the buhr-casing casting 29.

The operation of the mechanism just described is as follows:

When the trammeling buhr is to be put in place, it is turned so that the notches 93 are in register with the lugs 88, in which position the plate 91 can be shoved into place, thus locating the trammeling buhr 90. It is then turned anti-clockwise, as seen in Fig. 10, until the lugs 94 engage the lugs 95, and thrust of the auger serves to hold these lugs in position and the plate 91 in place, while the connections shown permit the necessary trammeling of the buhr 90 as it co-operates with the rotating buhr 96 secured to the plate 35.

As will be seen from the dotted-line outline of the trammeling buhr 90, shown in Fig. 10, it is provided on its inner periphery with a plurality of teeth 99 which have sharp edges and project inward into shearing engagement with the adjacent periphery of the buhr 33, thus furnishing additional means for disintegrating the material before it reaches the grinding surfaces of the buhr plates.

Referring to the action of the tooth 75 and the co-operating elements, it will be apparent that the teeth on the sleeve 32 feed the corn as it is being broken up toward the outlet from the concave and hopper, through which outlet the screw 33 extends, and as the rate of feed is usually faster than the corn can pass through the outlet, it tends to pile up adjacent the outlet, and this is especially true of the corn which may not have been sufficiently broken up. The corn so piled up is engaged by the tooth 75 and forced back to the center over that beneath it, which is being fed in the opposite direction by the teeth on the sleeve 32; so that a circuit, as it were, is established for the corn: outward adjacent the sleeve 32 to the outlet, then upward for some of the corn, and inward (especially for any that is not sufficiently broken up), then back to the center, where it drops down again and is subjected to further grinding as it once more moves outward to the outlet. It will also be noted that both of the teeth 74 and 75 have the angle of their spires very small, and the teeth are quite long axially and are wide enough radially so that they reach nearly to the teeth on the sleeve 32, so that the teeth 74 and 75 have some action in co-operation with said teeth on the sleeve 32 in breaking up the ears of corn. Furthermore, the above-described shape of the teeth 74 and 75 is such that the corn husks cannot very well wind about the sleeve 68, and to lessen this possibility, it will be noted that the ends of the teeth 74 and 75 overlap.

While I have shown and described my invention as embodied in the form which I at present consider best adapted to carry out its purposes, it will be understood to be capable of modifications, and that I do not desire to be limited in the interpretation of the following claims except as may be necessitated by the state of the prior art.

What I claim as new, and desire to secure by Letters Patent of the United States, is:

1. In a machine of the class described, the combination with a hopper, of a toothed concave secured at the bottom thereof, a shaft journaled concentrically with the concave, teeth on the shaft co-operating with the teeth on the concave, a discharge outlet from one end of the concave toward which the material is fed by the teeth on the shaft, a second shaft journaled in the hopper above the toothed shaft, and a projection on said second shaft designed to feed the material, passing some of it back toward the center of the hopper.

2. In a machine of the class described, the combination with a hopper, of a toothed concave secured at the bottom thereof, a shaft journaled concentrically with the concave, teeth on the shaft co-operating with the teeth on the concave, a discharge outlet from one end of the concave toward which the material is fed by the teeth on the shaft, a second shaft journaled in the hopper above the toothed shaft, and projections on said second shaft designed to feed the material, passing some of it back toward the center of the hopper, said projections consisting of a plurality of helical members projecting from the shaft, the helixes at each end being so directed that they tend to force the material toward the center.

3. In a machine of the class described, the combination with a hopper, of a toothed concave secured at the bottom thereof, a shaft journaled concentrically with the concave, teeth on the shaft co-operating with the teeth on the concave, a discharge outlet from one end of the concave toward which the material is fed by the teeth on the shaft, a second shaft journaled in the hopper above the toothed shaft, projections on said second shaft designed to feed the material, passing some of it back toward the center of the hopper, and speed-reducing gearing from the first shaft to the agitator shaft.

4. In a machine of the class described, the combination with a hopper, of a toothed concave secured to the bottom thereof, a shaft journaled concentrically with the concave, teeth on the shaft co-operating with the teeth on the concave, a discharge outlet from one end of the concave toward which the material is fed by the teeth, a bearing in one end of the hopper, a short shaft extending through the bearing, a gear wheel secured on the outer end of the shaft, an opposed stud shaft supported from the other end of the hopper, a sleeve journaled on the stud shaft at one end and having its other end pinned to the short shaft, projections on said sleeve designed to feed the material, passing some of it back toward the center of the hopper, and speed-reducing gearing from the first shaft to said gear wheel.

5. In a machine of the class described, the combination with a hopper, of a toothed concave secured at the bottom thereof, a shaft journaled concentrically with the concave, teeth on the shaft co-operating with the teeth on the concave, a discharge outlet from one end of the concave toward which the material is fed by the teeth on the shaft, a second shaft journaled in the hopper above the toothed shaft, and a helical tooth of a small curvature extending from the outlet end of said second shaft back toward the center and serving to feed material above the outlet back toward the center of the hopper.

6. In a machine of the class described, the combination with a casing having an outlet aperture therein, of a shaft mounted to rotate therein and having shearing teeth thereon, said teeth being designed to carry the material toward the outlet aperture, a concave member forming the bottom of the casing and having plural rows of shearing teeth, and means to adjust said concave both vertically and horizontally relative to the casing to determine the clearance between the two sets of teeth, said means consisting of a plurality of elongated slots at one edge of the concave with a bearing lug above each slot and another slot on the opposite side, vertical screw bolts passing through said slots and apertures above them in the casing, and horizontally adjustable stop bolts set in the casing on the side opposite to the bearing lugs.

7. In a machine of the class described, the combination with a casing having an outlet aperture therein, of a shaft mounted to rotate therein and having shearing teeth thereon, said teeth being designed to carry the material toward the outlet aperture, a concave member forming the bottom of the casing and having plural rows of shearing teeth, and means to adjust said concave both vertically and horizontally relative to the casing to determine the clearance between the two sets of teeth, said means consisting of a plurality of elongated slots at one edge of the concave with a bearing lug above each slot and another slot on the opposite edge, vertical screw bolts passing through said slots and apertures above them in the casing, and horizontally adjustable stop bolts set in the casing on the side opposite to the bearing lugs, the heads of the bolts at the bearing lugs being seated in correspondingly shaped recesses formed in the casing.

8. In a machine of the class described, the combination with a casing having an outlet aperture therein, of a shaft mounted to rotate therein and having shearing teeth thereon, said teeth being designed to carry the material toward the outlet aperture, a concave member forming the bottom of the casing and having plural rows of shearing teeth, and means to adjust said concave both vertically and horizontally relative to the casing to determine the clearance between the two sets of teeth, said means consisting of a plurality of elongated slots at one edge of the concave with a bearing lug above each slot and another slot on the opposite edge, vertical screw bolts passing through said slots and apertures above them in the casing, and horizontally adjustable stop bolts set in the casing on the side opposite to the bearing lugs, the horizontal bolts being threaded through nuts set in correspondingly shaped recesses in the casing.

9. In a machine of the class described, the combination with a hopper, of a toothed concave secured at the bottom thereof, a shaft journaled concentrically with the concave, teeth on the shaft co-operating with the teeth on the concave, a discharge outlet from one end of the concave toward which the material is fed by the teeth on the shaft, a second shaft journaled in the hopper above the toothed shaft, and a pair of oppositely-directed helical teeth of small curvature extending from the ends of the second shaft to a point well past the center, and serving to feed material toward the center of the hopper.

10. In a grinding machine, the combination with the concave casing, of a buhr casing into which the concave casing opens, a shaft extending through said casings and journaled to rotate therein, an auger secured on the shaft and extending through the opening between the two casings, rotating buhr on the shaft, and a trammeling buhr co-operating therewith and having cutting teeth extending substantially to the adjacent peripheral surfaces of the auger, said cutting teeth and adjacent peripheral surfaces being in a common vertical plane.

11. In a grinding machine, a shaft having a toothed sleeve with its ends fitting snugly on the shaft, one of its ends being pinned thereto, an auger on said shaft having its end adjacent the toothed sleeve interlocked therewith, and a buhr plate with its hub abutting the other end of the auger and pinned to the shaft.

12. In a grinding machine, the combination with a casing having a concave, of a buhr casing into which said concave opens, a shaft journaled to rotate therein and having teeth to cooperate with the concave, and an auger to carry material from the concave to the buhr casing, a sliding plate to regulate the size of the aperture from the concave to the buhr casing, and means for adjusting and securing the plate.

13. In a grinding machine, the combination with a casing having a concave, of a buhr casing into which said concave opens, a shaft journaled to rotate therein and having teeth to cooperate with the concave, and an auger to carry material from the concave to the buhr casing, a sliding plate to regulate the size of the aperture from the concave to the buhr casing, and means for adjusting and securing the plate, consisting of a lever and pivotally connected to the slide and having a spring catch lever co-operating with a notched segment.

14. In a machine of the class described, the combination with a hopper, of comminuting means located in the lower portion thereof, an agitator shaft journaled in the hopper above the comminuting means, and projections on the agitator shaft designed to feed the material passing it toward the center of the hopper, said projections consisting of elongated circular teeth of a small curvature and of radial dimensions approximating the diameter of jerked Indian corn.

In witness whereof, I have hereunto set my hand this 22nd day of April, 1924.

JOHN HOLLAND-LETZ.